US009821948B2

(12) United States Patent
Noer et al.

(10) Patent No.: US 9,821,948 B2
(45) Date of Patent: Nov. 21, 2017

(54) BICYCLE TRANSPORT BAG (71) Applicant: THULE IP AB, Malmo (SE)

(72) Inventors: Michael Noer, Stillwater, MN (US);
Patrick Maguire, Dunedin (NZ);
Timothy Armstrong, Dunedin (NZ);
Gary Gibson, Dunedin (NZ)

( * ) Notice: Subject to any disclaimer, the term of this patent is extended or adjusted under 35 U.S.C. 154(b) by 0 days.

(21) Appl. No.: 14/398,182

(22) PCT Filed: Dec. 5, 2013

(86) PCT No.: PCT/EP2013/075625
§ 371 (c)(1),
(2) Date: Oct. 31, 2014

(87) PCT Pub. No.: WO2014/086907
PCT Pub. Date: Jun. 12, 2014

(65) Prior Publication Data
US 2015/0266664 A1 Sep. 24, 2015

Related U.S. Application Data (60) Provisional application No. 61/733,710, filed on Dec. 5, 2012.

(51) Int. Cl.
*B65D 85/68* (2006.01)
*A45C 5/14* (2006.01)
(Continued)

(52) U.S. Cl.
CPC .............. *B65D 85/68* (2013.01); *A45C 5/00* (2013.01); *A45C 5/14* (2013.01); *A45C 13/02* (2013.01);
(Continued)

(58) Field of Classification Search
USPC ............................................... 206/335, 315.1
See application file for complete search history.

(56) References Cited

U.S. PATENT DOCUMENTS 2,339,947 A * 1/1944 Reaume ................ B65D 85/68
206/335
3,886,988 A 6/1975 Garrett
(Continued)

FOREIGN PATENT DOCUMENTS

WO WO 2008/109986 A1 9/2008

OTHER PUBLICATIONS

International Search Report prepared by the European Patent Office dated Feb. 21, 2014, for International Application No. PCT/EP2013/075625.
(Continued)

Primary Examiner — Jacob K Ackun
(74) Attorney, Agent, or Firm — Sheridan Ross PC (57) ABSTRACT

A bicycle transport bag (1) comprising a bicycle supporting frame structure (10) and a covering (6), wherein the supporting frame structure (10) comprises frame elements which are arranged to be assembled in a first bicycle supporting configuration inside the covering (6). The frame elements are removable from the covering (6) and are arranged to be reassembled into a second different bicycle supporting configuration outside of the covering (6). In the second bicycle supporting configuration, the bicycle supporting frame structure (10) may take the form of a bicycle work stand.

15 Claims, 7 Drawing Sheets

(51) Int. Cl.
   *A45C 13/02*   (2006.01)
   *B62J 99/00*   (2009.01)
   *B62J 19/00*   (2006.01)
   *A45C 5/00*    (2006.01)
   *A45C 13/04*   (2006.01)
   *B25H 1/00*    (2006.01)
   *B65D 30/10*   (2006.01)
   *B65D 33/02*   (2006.01)

(52) U.S. Cl.
   CPC ......... *A45C 13/04* (2013.01); *B25H 1/0014* (2013.01); *B62J 19/00* (2013.01); *B62J 99/00* (2013.01); *B65D 31/16* (2013.01); *B65D 33/02* (2013.01); *B65D 2585/6862* (2013.01)

(56) References Cited

U.S. PATENT DOCUMENTS

| | | | | |
|---|---|---|---|---|
| 4,390,088 A | * | 6/1983 | Brenner | B62J 9/00 206/335 |
| 4,438,606 A | * | 3/1984 | Chardon | E04H 1/1238 109/50 |
| 4,792,039 A | * | 12/1988 | Dayton | A45C 5/14 206/304 |
| 4,892,190 A | * | 1/1990 | Delgado | B62J 99/00 206/304 |
| 4,944,340 A | * | 7/1990 | Tortorich | B60R 9/055 150/167 |
| 4,991,715 A | | 2/1991 | Williams | |
| 5,205,573 A | * | 4/1993 | Mhedhbi | B62K 15/00 206/335 |
| 5,320,227 A | * | 6/1994 | Minoura | B25H 1/0014 211/22 |
| 5,669,497 A | * | 9/1997 | Evans | B65D 85/68 206/335 |
| 2004/0222617 A1 | * | 11/2004 | Darling, III | A61G 1/013 280/651 |
| 2010/0230311 A1 | * | 9/2010 | Jacques | A45C 11/00 206/335 |

OTHER PUBLICATIONS

Written Opinion prepared by the European Patent Office dated Feb. 21, 2014, for International Application No. PCT/EP2013/075625.

* cited by examiner

BICYCLE TRANSPORT BAG

CROSS REFERENCE TO RELATED APPLICATION

This application is a national stage application under 35 U.S.C. 371 of PCT Application No. PCT/EP2013/075625 having an international filing date of Dec. 5, 2013, which designated the United States, which PCT application claimed the benefit of U.S. Application Ser. No. 61/733,710, filed Dec. 5, 2012, both of which are incorporated by reference in their entirety.

TECHNICAL FIELD

The invention pertains to a bicycle transport bag comprising a bicycle supporting frame structure and a covering.

BACKGROUND OF THE INVENTION

Over time, bicycling has become increasingly more popular as a means for recreation and exercise often involving a need for transporting the bicycle to the location of a cycling competition or to bring along a bicycle when travelling for recreational purposes. For this reason, bicycle transport bags and cases have been developed, allowing a partially disassembled bicycle to be stowed in the case and to be transported in a convenient and protected manner. The bicycle cases are suited for airline, train, bus and car travel and are generally provided with wheels and a handle so that they are easy to lift and to pull by hand in the manner of an ordinary wheeled suitcase.

One example of a bicycle case of this kind is found in WO 2008/109986 A1. The disclosed bicycle case comprises a reinforced soft-shell bag which can be opened up in two parts along a central zipper and has a tray-like rectangular bottom part equipped with four wheels placed at the corners of the bottom part. The bottom part comprises a central rail with holders or mounts for holding the bicycle frame in an upright position inside the bag. The bag further comprises straps, fixtures for bicycle wheels, pockets for bicycle accessories and smaller bicycle components and inflatable air bags to immobilize the bicycle parts inside the bag.

U.S. Pat. No. 3,886,988 A discloses a flexible transport bag for a bicycle, the bag having a rigid bottom plate with wheels and fixtures for mounting the bicycle frame in an upside-down configuration inside the bag.

U.S. Pat. No. 4,991,715 A discloses a transport case for a bicycle and comprises a rigid base plate and a flexible cover. The base plate comprises a front and a rear mount for mounting of the bicycle frame in the transport case.

Although these prior art bicycle transport bags have made travelling with a bicycle easier and more convenient, a problem remains when the transported bicycle is taken out of the transport case and is to be reassembled for use. As the assembly will generally be performed in a location without access to suitable equipment, it is an object of the invention to provide a means for facilitating assembly of the transported bicycle parts and servicing of the bicycle after it has been removed from the transport bag.

SUMMARY OF THE INVENTION

In accordance with the invention is offered a bicycle transport bag comprising a bicycle supporting frame structure and a covering. The bicycle supporting frame structure comprises frame elements which are arranged to be assembled in a first bicycle supporting configuration inside the covering. The frame elements are removably arranged in the covering and may be taken out of the covering and be reassembled into a second bicycle supporting configuration outside of the covering. The first bicycle supporting configuration is different from the second bicycle supporting configuration.

Accordingly, the bicycle supporting frame structure may be used inside the covering for supporting a bicycle frame in place in an upright position in the transport bag during transport of the bicycle and outside the covering as a free-standing bicycle work stand on which the bicycle can be mounted for assembly and servicing.

The supporting frame may include one or more bicycle holders for holding the bicycle frame and optionally other parts of a partially disassembled bicycle firmly in place on the supporting frame both when the supporting frame is in the first bicycle supporting transport configuration and when the supporting frame is in the second bicycle supporting service configuration. Alternatively, or in addition to bicycle holders which form part of the supporting frame, bicycle holders may be provided separate from the supporting frame. Bicycle holders which are not directly attached to the supporting frame when the supporting frame is arranged inside the covering may be arranged on a base plate and may be attached to the base plate in a removable manner or in a non-removable manner. The one or more bicycle holders may be adjustably arranged on the supporting frame structure and/or on a base plate to accommodate bicycle frames of different sizes and shapes. Adjustability may be provided in one or both of the bicycle supporting configurations of the supporting frame structure.

The second configuration of the supporting frame structure need not consist of all elements of the first configuration of the supporting frame structure. Accordingly, the supporting frame structure may be arranged to be only partly removed from the transport bag covering before reassembly into the second configuration, leaving one or more frame elements which are not used when forming the free-standing bicycle work stand in the transport bag covering. In a corresponding manner, the supporting frame elements arranged inside the covering may include one or more bicycle holders or other components of a bicycle work stand that are not used for supporting the bicycle inside the bicycle transport bag. The elements of the supporting frame structure and, in particular, elongated frame elements such as bicycle stand legs constitute reinforcing elements inside the transport bag covering and serve to increase the rigidity and stability of the bottom part of the bicycle transport bag. Such elements may also form parts of a base grid on which other elements of the supporting frame structure are mounted.

When the supporting frame elements are rearranged into the second supporting configuration, also referred to herein as the service configuration or active configuration, the frame elements form a bicycle work stand, such as a tripod work stand. However, further bicycle work stand configurations are conceivable such as a saw-horse configuration or other configurations having three or more legs as well as one-legged and two-legged constructions where the leg or legs are attached to a supportive base such as a supportive base plate or a base grid.

The supporting frame structure may be arranged on a base plate inside the covering, such as a base plate of a rigid material. Suitable materials may be rigid plastic material, cardboard, wood, metal, or any combination thereof. The supporting frame structure may be resting freely on the base plate or may be directly or indirectly attached to the base plate with one or more elements. The base plate may be tray-shaped and may comprise a rim extending around a circumference of the base plate. Suitable shapes for the base plate in a horizontal plane include rectangular, square, and oval shapes as well as non-regular shapes adapted to a shape of a partially disassembled bicycle to be transported or stored in the bag. For reasons of easy transportation and stacking, rectangular shapes may be preferred.

The base plate may have an elongated shape with a front end at a front end edge and a rear end at a rear end edge, and two opposing side edges between the end edges. The frame structure may comprise at least two elongated frame elements which in the first bicycle supporting transport configuration are arranged along each of the opposing side edges of the base plate. The two elongated frame elements may form part of a base grid, comprising transversely extending connecting members. Such connecting members may be bicycle holders or docks for bicycle holders. The frame structure may comprise a first bicycle holder directly or indirectly attached to the elongated frame members at the front end of the base plate and a second bicycle holder directly or indirectly attached to the elongated frame members at a location between the first bicycle holder and the rear end of the base plate.

A further frame element in the form of a bicycle stand head may be arranged on the base plate, such as between the second bicycle holder and the rear end of the base plate.

The bicycle stand head may be a tripod head and three elongated frame elements in the form of tripod legs may be arranged on the base plate. The tripod legs and the tripod head are arranged to be removed from the transport bag casing and to form a tripod bicycle work stand when the frame elements are assembled into the second bicycle supporting configuration.

At least one further supporting frame element may be provided in the form of a bicycle supporting member for providing horizontal support to a bicycle frame when the supporting frame is in the second configuration. The one or more bicycle supporting members are attached to the bicycle stand head and are used to support and stabilize the bicycle in an elevated position on top of the bicycle work stand. A bicycle supporting member may be in the form of a rod or a tube having circular cross-section. It may be desirable to use two such members which are mounted parallel to each other in order to stabilize the support arrangement and avoid rotation of a bicycle mount attached to a single supporting member. Another way of minimizing the risk of inadvertent rotation of a mount on a supporting member is to use a supporting member having a non-circular cross-section, for instance a square, oval or triangular cross-section.

In order to save space inside the bicycle transport bag, the further supporting frame element or elements may be telescopically inserted into at least one hollow frame element, e.g. a tripod leg or other bicycle stand leg, when the frame structure is in the first bicycle supporting configuration.

The bicycle supporting member or members may be arranged to be attached to the bicycle stand head and the first and second bicycle when the frame structure is in the second bicycle supporting configuration. It may be advantageous that the bicycle supporting member is attached to the bicycle holder or bicycle holders in the same manner when the frame structure is in the first bicycle supporting configuration as when the frame structure is in the second bicycle supporting configuration. A bicycle frame mounted on the bicycle holder or holders inside the bicycle bag may then be lifted out of the bag while still connected to the bicycle holder or holders and may be directly connected to other parts of the bicycle work stand which have been assembled outside of the covering. In this way, transfer of the bicycle to the bicycle work stand assembled outside of the transport bag can be performed quicker and more efficiently than if the bicycle first had to be detached from the holders inside the bicycle bag and then reattached after assembly of the frame elements outside the bicycle bag.

The connection between the bicycle stand head and the one or more bicycle supporting members may be a slidable connection allowing horizontal adjustment of the position and the centre of gravity of the bicycle when mounted on the bicycle. A slidable connection may be provided by a clamping member and may comprise means for locking the bicycle stand head in a desired position on the bicycle supporting member or members.

The base plate may be foldable and may comprise hinge means whereby the base plate can be folded along at least one fold line to create a more compact and space-saving configuration suitable for storage of the transport bag when it is not used for accommodating a bicycle.

The hinge means may be formed from a flexible material which forms a connection between two more rigid parts of the base plate. Such flexible materials may be textiles, plastic, leather, etc. which allow the base plate to be folded. The transport bag may comprise means for securing the bag in the folded position. Such securing means may be any type of conventionally used fasteners such as snap-fasteners, straps, hook-and-loop fasteners, and the like.

The collapsible covering may be provided with removable stiffening members. Such stiffening members stabilize the shape of the bicycle transport bag and shield a bicycle packaged in the bag from outside impact. The stiffening members may also provide a cushioning effect to further improve protection for the packaged bicycle. Removable stiffening members may be in the form of one or more rigid rod, sheet or frame. Suitable materials are preferably lightweight and include rigid plastics, foamed plastics and reinforced plastic materials such as fiber-reinforced materials or textile/plastic sheet laminates. Different types and configurations of stiffening members may be used in different parts of the covering.

The collapsible covering may comprise pockets for receiving and retaining the removable stiffening members. Other ways of applying the stiffening members to the covering may be by means of buttons, snap fasteners, hook-and-loop fasteners, etc.

The collapsible cover may be made from a flexible sheet material such as a textile material, a plastic film material or combinations thereof. The cover is preferably light-weight and durable and may also have properties such as liquid impermeability and stain resistance. By a durable material is meant a material having high tear resistance and high puncture resistance so that it may be repeatedly handled during transport without rupturing or tearing.

The bag may be provided with wheels and a pull-handle. The wheels may be mounted on the supporting frame and/or on the base plate, if present. The wheels may be two wheels placed at the rear end of the bag and the pull-handle may be placed at the front end of the bag. The number and arrangement of the wheels should not be considered limiting to the invention. Accordingly, arrangements with three, four or even more wheels may be used. Furthermore, the bag may have two or more pull-handles, one or more lift-handle, etc.

The supporting frame and/or a base plate and/or the flexible covering may comprise fasteners for parts of the bicycle work stand which do not form part of the supporting frame. Such parts may include bicycle stand feet, bicycle stand leg stabilizing members, etc. Furthermore, when the bicycle transport bag includes a base plate, the supporting frame may be connected to the base plate by means of fasteners allowing removal of those elements of the supporting frame which are intended to be used when forming a bicycle work stand outside of the bag. Suitable fasteners include snap-in fasteners, clamps, straps, buckles, etc. as known in the art. The fasteners are optional elements of the bicycle transport bag as the supporting frame and additional parts of the bicycle work stand may be held mechanically in place for instance by being obstructed from sideways movement by a rim on the base plate. Small loose parts may be trapped between the base plate and the supporting frame and/or a bicycle frame mounted on the base plate. The supporting frame may be mechanically trapped between the base plate and the covering when a bicycle frame is mounted on the supporting frame and the covering is closed.

The bicycle transport bag covering may be provided with any type of suitable arrangement for opening and closing the cover, such as straps, clasps, buttons and zippers as known in the art. A zipper may be a convenient means for opening and closing the cover. The zipper may be placed in a longitudinal direction through the bicycle transport bag so that the cover can be opened in two halves that fold out at the sides of the bag.

BRIEF DESCRIPTION OF THE DRAWINGS

The invention will be described in greater detail with reference to the appended drawings in which.

DETAILED DESCRIPTION

Figure 1:
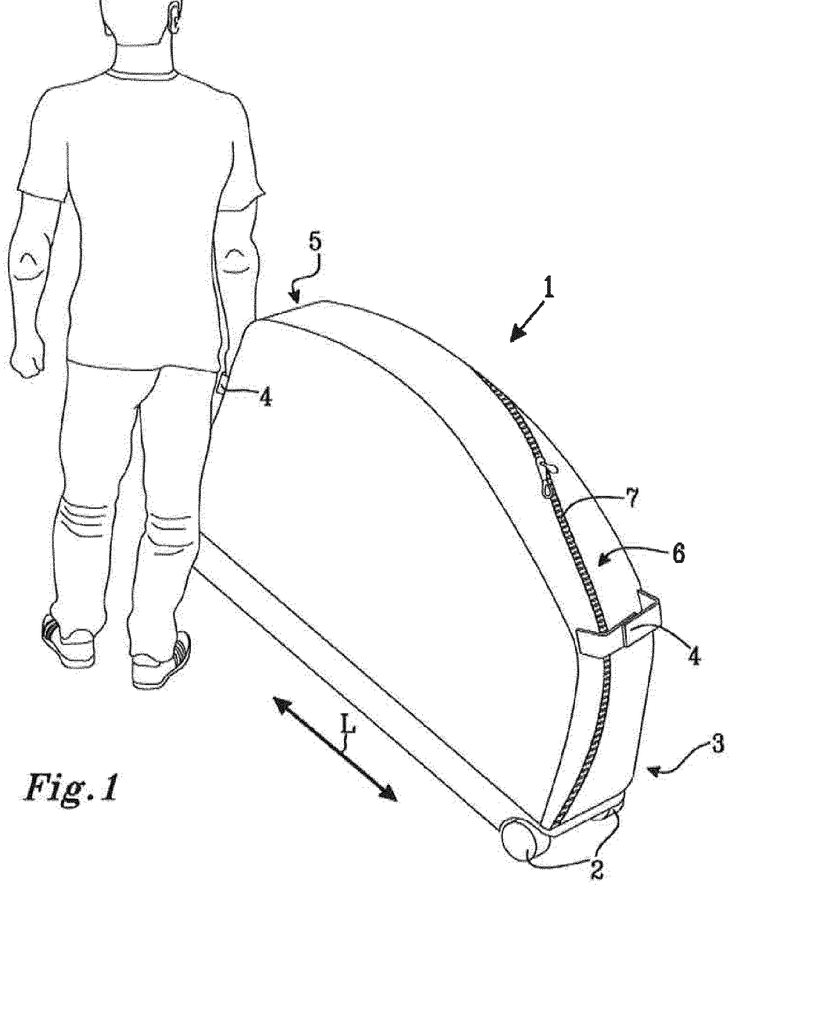
FIG. 1 shows a bicycle transport bag being pulled by a person.

The bicycle transport bag 1 that is shown in FIG. 1 while being pulled by a person comprises two wheels 2 placed at the rear end 3 of the bicycle transport bag 1 and a pull-handle 4 placed at the front end 5 of the bicycle transport bag 1. The arrangement of the wheels and the handle which is shown in FIG. 1 should not be considered limiting to the invention. As set out herein, arrangements with three or more wheels may be used as well as one or more additional pull-handle, one or more lift-handle, etc.

The bicycle transport bag 1 includes a light-weight flexible covering 6. The covering 6 is provided with a zipper 7 for opening and closing the covering 6. The zipper 7 extends in a longitudinal direction, L, of the bicycle transport bag 1, allowing the covering 6 to be opened up in two halves that fold out at the sides of the bicycle transport bag 1. The zipper 7 on the bicycle transport bag 1 in FIG. 1 extends generally diagonally across the covering 6 between the front end 4 and the rear end 3 of the bicycle transport bag 1. As set out herein, other opening configurations and opening means may be used in place of the shown zipper. For the sake of illustration, in FIG. 2, the zipper 7 is shown to extend in the longitudinal direction L in an arch from one side of the lower part of the bicycle transport bag 1, across the upper part of the covering 6 and down again to the lower part on the same side of the bicycle transport bag 1.

Figure 2:
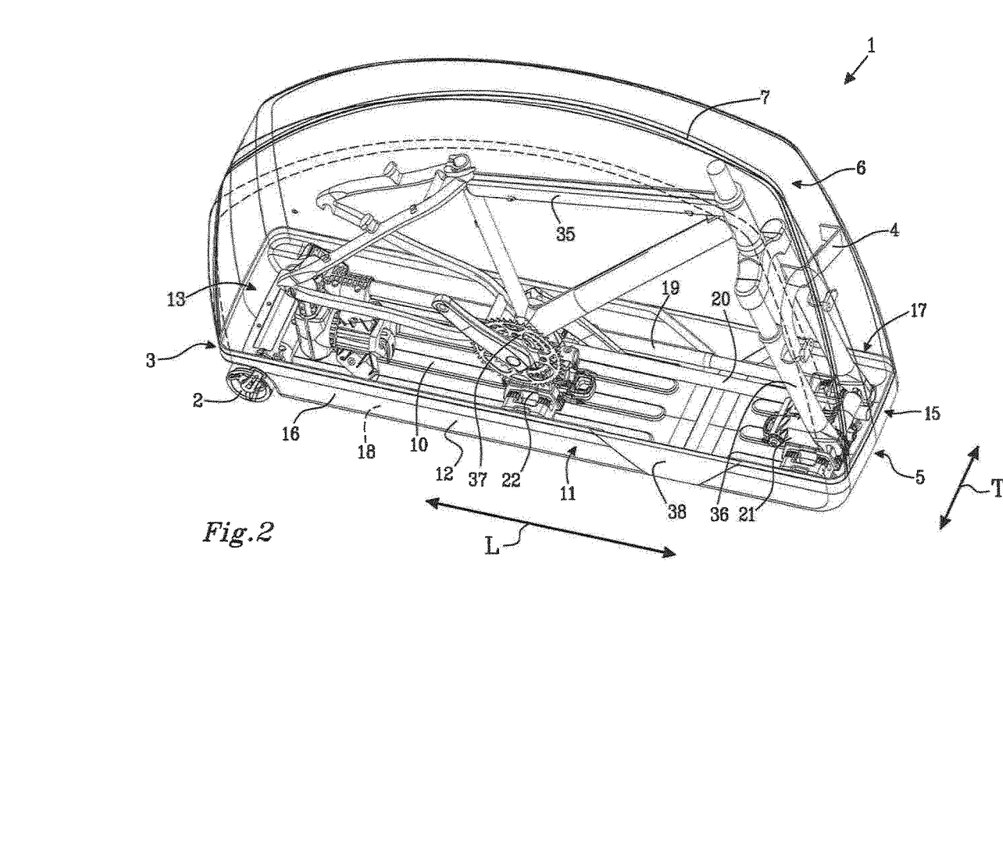
FIG. 2 shows a bicycle frame mounted on a bicycle supporting frame inside a bicycle transport bag.

Except for the different arrangement of the zipper 7, the bicycle transport bag shown in FIG. 2 is identical to that in FIG. 1.

As seen in FIG. 2 the bicycle transport bag 1 comprises a bicycle supporting frame structure 10 which is made up from multiple frame elements arranged on a tray-shaped generally rectangular base plate 11 having a peripheral rim 12.

Figure 3:
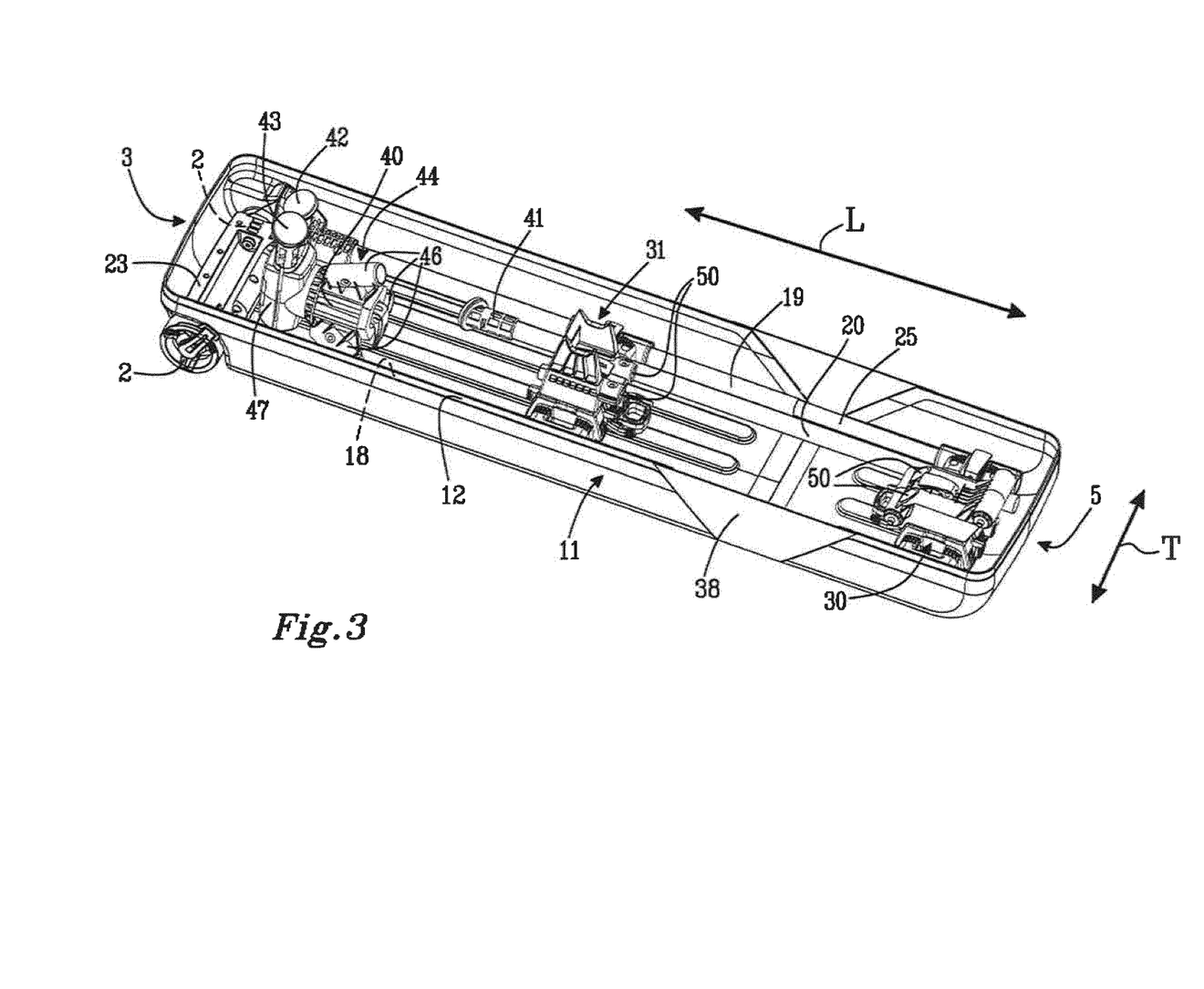
FIG. 3 shows a base plate and a bicycle supporting frame of the bicycle transport bag in FIG. 2.
Figure 4:
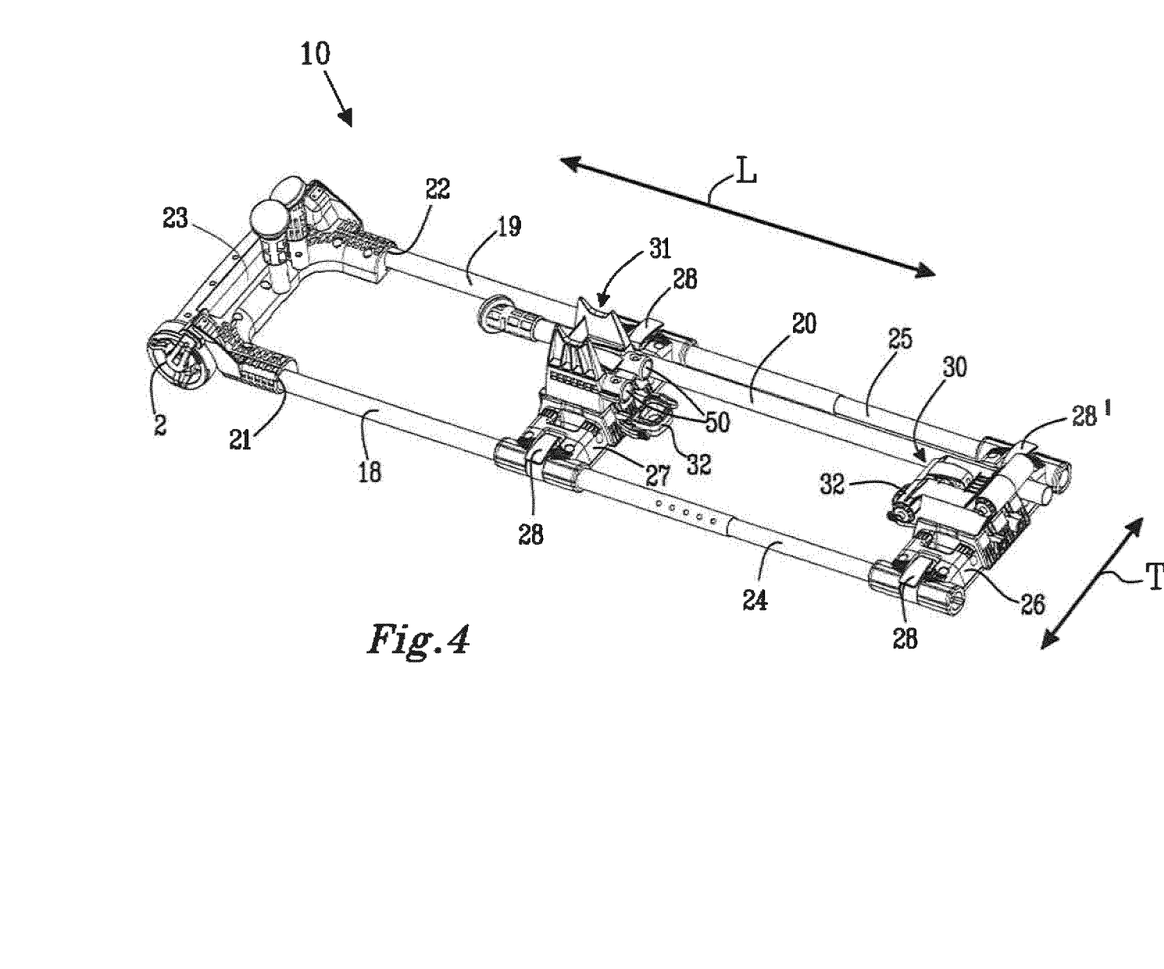
FIG. 4 shows a detail of the bicycle supporting frame in FIG. 3.
Figure 5:
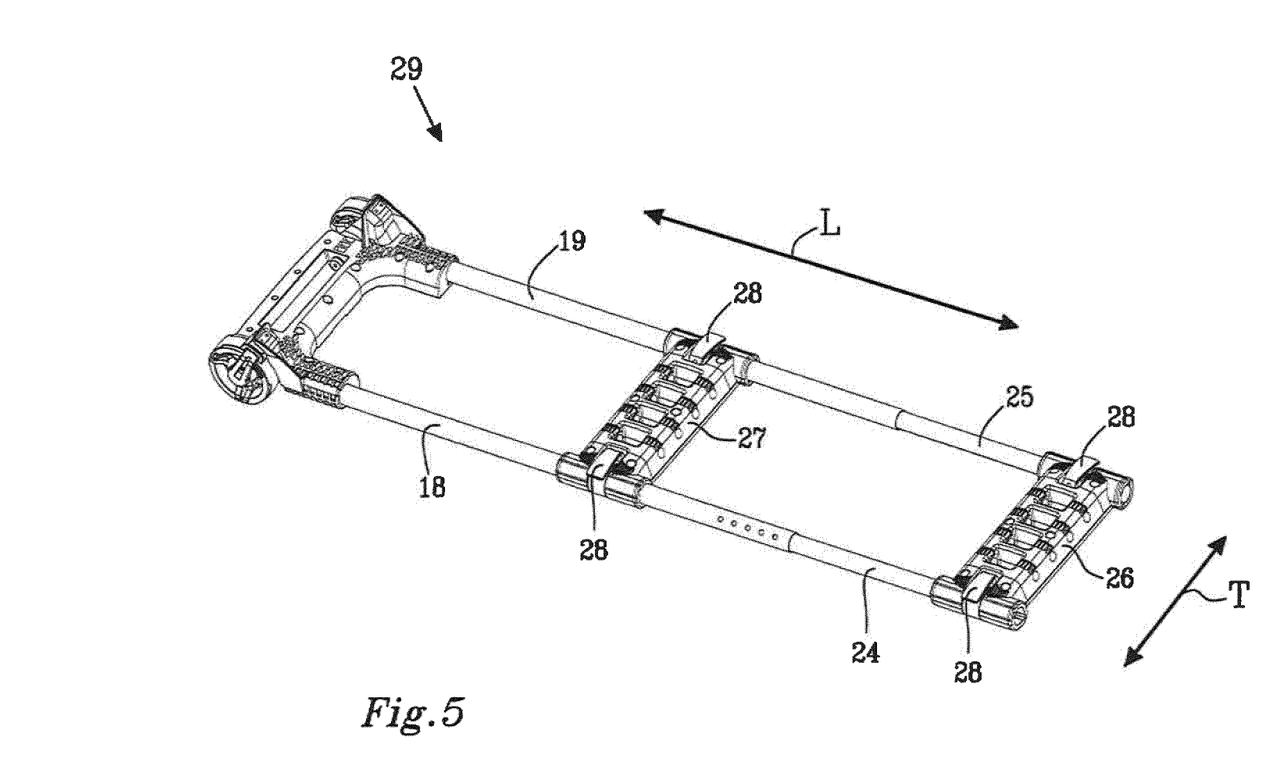
FIG. 5 shows the bicycle supporting frame in FIG. 4 with further added components.

The base plate 11 has an elongated shape in the longitudinal direction L of the bicycle transport bag 1 with a rear end edge 13 at the rear end 3 of the bicycle transport bag 1, and a front end edge 15 at the front end 5 of the bicycle transport bag 1 and two opposing side edges 16, 17 between the end edges 13, 15. The arrangement of the bicycle supporting frame structure 10 on the base plate 11 is shown in FIG. 3. FIGS. 4 shows only the bicycle supporting frame structure 10 and FIG. 5 shows a part of the bicycle supporting frame structure 10. The bicycle supporting frame structure 10 comprises a first group of elongated frame elements consisting of three elongated hollow frame elements 18, 19, 20 which are arranged on the base plate 11 with one frame element 18 along one side edge 16 of the base plate 11 and two frame elements 19, 20 along the other side edge 17 of the base plate 11.

As is best seen in FIGS. 4 and 5 two of the first group of frame elements 18, 19 are inserted with a rearward end into frame element holders 21, 22 arranged on a rear cross bar 23 which is placed at the rear end of the bicycle transport bag 1. The rear cross bar 23 also carries the wheels 2 of the bicycle transport bag 1.

The bicycle supporting frame structure 10 further comprises a second group of elongated frame elements consisting of two elongated rod-shaped frame elements 24, 25. The elongated rod-shaped frame elements 24, 25 are inserted into the forward ends of the elongated frame elements 18, 19 which are attached to the rear cross bar 23.

The combined elongated frame elements 18, 19, 24, 25 from the first and second groups of elongated frame elements form longitudinal support elements along the side edges 16, 17 of the base plate 11. The longitudinal support elements are connected in the transverse direction T by a first dock 26 placed at the front end 5 of the bicycle transport bag 1 and a second dock 27 placed between the first dock 26 and the rear cross bar 23. The first and second docks 26, 27 are releasably affixed to the combined elongated frame elements 18, 19, 24, 25 by means of clamping members 28. The combined elongated frame elements 18, 19, 24, 25, the rear cross bar 23 and the first and second docks 26, 27 form a base grid 29 as shown in FIG. 5. The base grid 29 constitutes a support structure for further elements of the bicycle supporting frame structure 10 in the bicycle transport bag 1.

Figure 6:
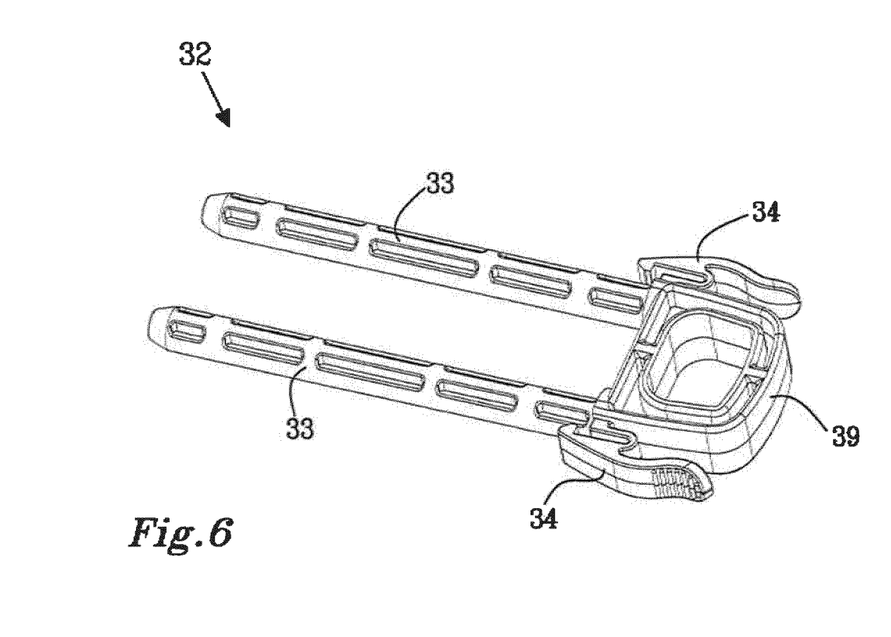
FIG. 6 shows a pin for fixing of a bicycle holder on a dock.

With particular reference to FIG. 4, a first bicycle holder 30 is affixed to the first dock 26 at the front end 5 of the bicycle transport bag 1 and a second bicycle holder 31 is affixed to the second dock 27 in the central portion of the bicycle transport bag 1. The first and second bicycle holders 30, 31 are affixed to the first and second docks 26, 27 by means of fixing pins 32. A fixing pin is shown in FIG. 6 and has two legs 33, two spring-loaded clamping members 34 and a head portion 35. When affixing a bicycle holder on a dock, the legs 33 of the fixing pin 32 are inserted into aligned holes in the holder and the dock. The fixing pin 32 is locked in position by the clamping members 34 being brought into engagement with a locking protrusion arranged on the bicycle holder.

In FIG. 2, the bicycle transport bag 1 is shown with a bicycle frame 35 mounted on the bicycle supporting frame structure 10 inside the bicycle transport bag 1. The bicycle frame 35 is mounted in an upright position with the bicycle fork 36 held by the first bicycle holder 30 constituting a bicycle fork mount and with the crank-case portion 37 held by the second bicycle holder 31 constituting a bicycle crank-case mount.

The base plate 11 is foldable and is provided with hinge means 38 in the form of a portion of the base plate which is made from a flexible material and which extends as a band in a transverse direction T across the base plate 11 and comprises wedge-shaped portions in the peripheral rim 12 on the base plate 11. The hinge means 38 allow the front end 5 of the base plate 11 to be folded in a direction towards the rear end 13 of the base plate to create a more compact and space-saving configuration suitable for storage of the bicycle transport bag 1 when it is not being used for containing a bicycle.

While the base plate 11 preferably is made from a rigid material, the hinge means 38 is formed from a more flexible material and forms a connection between the two rigid parts of the base plate. As set out herein, suitable flexible materials may be textiles, plastic, leather, rubber, etc. which allow the base plate to be folded.

FIG. 3 shows the base plate 11 and the bicycle supporting frame structure 10 without the covering. Apart from the frame elements constituting the base grid 29 and the bicycle holders 30, 31, further frame elements are shown to be arranged on the base plate 11. A frame element in the form of a tripod stand head 40 is arranged between the second bicycle holder 31 and the rear cross bar 23. The previously mentioned elongated frame element 20 which does not form part of the base grid 29 carries a bicycle stand foot 41 at one end of the elongated frame element 20. Two further bicycle stand feet 42, 43 are arranged at the rear end of the base plate 11. A leg stabilizing spindle 44 is placed on the base plate 11 in a folded configuration beneath the base grid 29.

As set out herein, the bicycle transport bag covering 6 may have pockets and other types of holders for bicycle parts and accessories. The bicycle transport bag 1 may also contain separate covers for the bicycle wheels and/or other bicycle parts and accessories. The covering is preferably at least partially made from a flexible sheet material such as a textile material, a plastic film material or combinations of such materials allowing the covering to be collapsed for convenient storage of the bicycle transport bag 1 when it is not being used.

The collapsible covering may be provided with removable reinforcing stiffening members such as sheets, plates, rods, etc. in order to provide the covering with improved shape stability and crush resistance when the bicycle transport bag is in use. The stiffening members may be arranged to be inserted into retaining pockets provided in the covering or may be attached to the covering by other means such as buttons, push-buttons, snap-fasteners, straps, etc. The reinforcing stiffening member may also provide a cushioning effect in order to further protect bicycle parts inside the bicycle transport bag. Cushioning material such as foam or wadding may be provided separate from any stiffening members. The bicycle transport bag is shown in the figures without any stiffening members or cushioning material.

Taking the bicycle out of the bicycle transport bag 1 and rearranging the bicycle supporting frame structure 10 into a second bicycle supporting configuration outside of the bicycle transport bag 1 may be performed in the following way:

First the bicycle transport bag 1 is opened by un-zipping the zipper 7 and folding out the two parts of the covering 6 to the sides of the bicycle transport bag 1. The fixing pins 32 are then removed in order to release the bicycle holders 30, 31 from the first and second docks 26, 27, whereafter the bicycle frame 35 can be lifted out of the bicycle transport bag 1 while still being attached to the holders 30, 31.

The base grid 29 is pulled out from the frame element holders 21, 22 on the rear cross bar 23 and the base grid 29 and other elements of the bicycle supporting frame structure 10 are then taken out of the bicycle transport bag 1.

The two elongated rod-shaped frame elements 24, 25 are separated from the hollow elongated frame elements 18, 19 and the first and second docks 26, 27 are removed from the elongated frame elements 18, 19, 24, 25.

Figure 7:
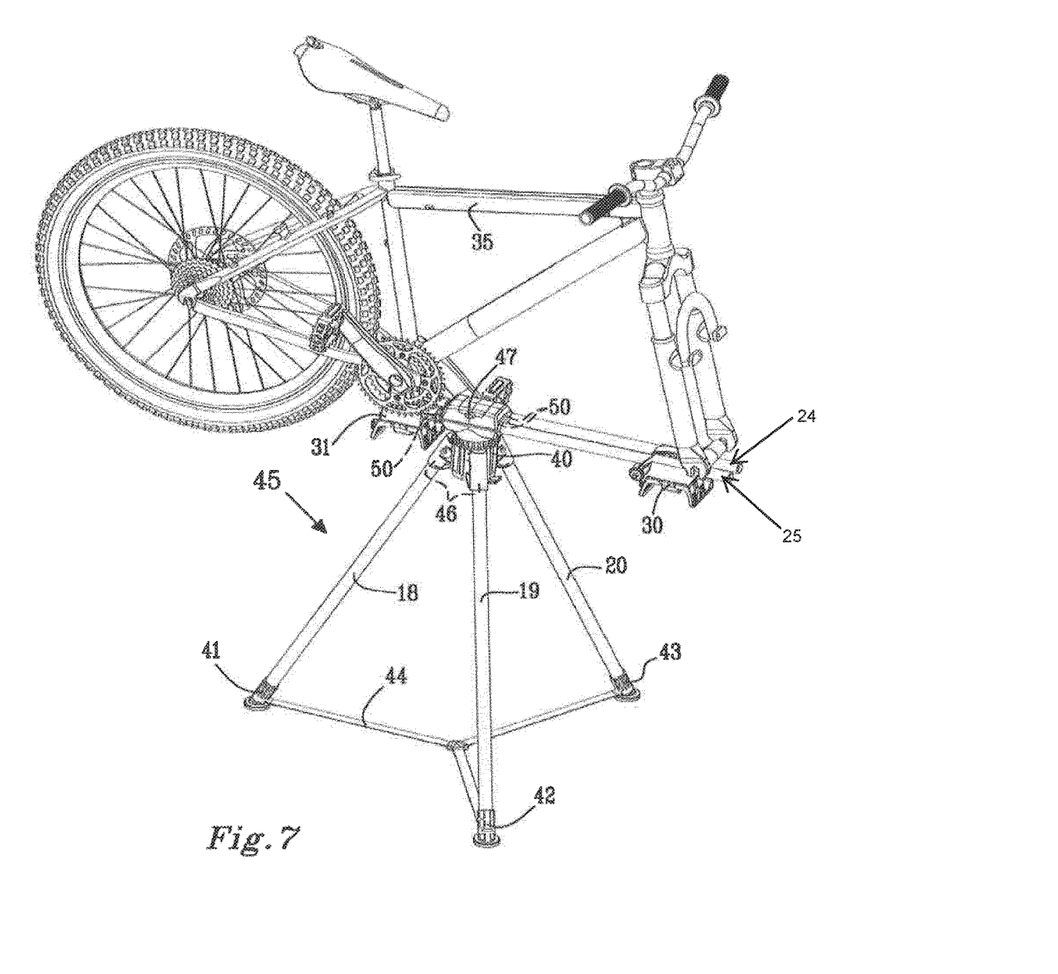
FIG. 7 shows the bicycle supporting frame in FIG. 3 taken out of the bicycle transport bag and reassembled into a bicycle work stand.

A tripod bicycle work stand 45 as shown in FIG. 7 is subsequently assembled from the bicycle supporting frame structure 10 elements which have been taken out of the bicycle transport bag 1. The frame elements 18-20 of the first group of elongated frame elements are inserted into leg holders 46 on the tripod head 40, thus forming tripod legs. The tripod feet 41, 42, 43 are attached at the free ends of the elongated frame elements 18, 19, 20 and the leg stabilizing spindle 44 is unfolded and attached between the tripod legs formed by the first group of elongated frame elements.

Subsequently, the two elongated rod-shaped frame elements 24, 25 are inserted into two corresponding tubular channels 50 arranged in the first and second bicycle holders 31 and the bicycle frame with the supporting members formed by the elongated rod-shaped frame elements 24, 25 is then lifted up and mounted on the tripod work stand 45 by fastening the elongated rod-shaped frame elements 24, 25 in a clamp 47 on the tripod head 40.

The bicycle supporting members formed by the elongated rod-shaped frame elements 24, 25 provide horizontal support to the bicycle frame 35 when the supporting frame structure 10 is in the second configuration which may also be referred to as the active configuration. The bicycle supporting members support and stabilize the bicycle in an elevated position on top of the bicycle work stand.

The clamp 47 on the tripod head 40 allows horizontal adjustment of the position and the centre of gravity of the bicycle when mounted on the tripod work stand.

What is claimed is:

1. A bicycle transport bag comprising:
a covering;
a bicycle supporting frame structure comprising a frame element;
a tripod head;
a plurality of hollow elongated frame elements;
wherein the bicycle supporting frame structure is operable to be provided in a first bicycle supporting configuration inside the bicycle transport bag, and is operable to be provided in a second bicycle supporting configuration outside of the bicycle transport bag;
wherein the second bicycle supporting configuration comprises a work stand;
wherein the hollow elongated frame elements are provided within the covering in the first bicycle supporting configuration and are inserted into the tripod head to form tripod legs in the second bicycle supporting configuration.

2. The bicycle transport bag of claim 1, wherein the covering comprises a collapsible covering.

3. The bicycle transport bag of claim 1, wherein the covering comprises at least one of straps, claps, buttons and zippers.

4. The bicycle transport bag of claim 1, wherein the tripod head comprises a clamp that allows horizontal adjustment of the position of the center of gravity of a bicycle mounted on the work stand.

5. The bicycle transport bag of claim 1, further comprising wheels provided at one end of the transport bag.

6. The bicycle transport bag of claim 5, further comprising at least one pull handle.

7. A bicycle transport bag comprising:
a covering;
a bicycle supporting frame structure comprising a first elongate frame element with a first bicycle holder provided at one end and a second bicycle holder provided at a second end;
a tripod head;
a plurality of hollow elongated frame elements that are selectively removable from the bag;
wherein the bicycle supporting frame structure is operable to be provided in a first bicycle supporting configuration inside the covering, and is operable to be provided in a second bicycle supporting configuration outside of the covering;
wherein the second bicycle supporting configuration comprises a work stand;
wherein the hollow elongated frame elements are inserted into the tripod head to form tripod legs in the second bicycle supporting configuration; and
wherein the tripod head comprises a clamp that allows horizontal adjustment of the position of the center of gravity of a bicycle mounted on the work stand.

8. The bicycle transport bag of claim 7, wherein the covering comprises a collapsible covering.

9. The bicycle transport bag of claim 7, wherein the covering comprises at least one of straps, claps, buttons and zippers.

10. The bicycle transport bag of claim 7, further comprising wheels provided at one end of the transport bag.

11. The bicycle transport bag of claim 7, further comprising at least one pull handle.

12. A bicycle transport bag comprising:
a covering;
a bicycle supporting frame structure comprising a first elongate frame element with a first bicycle holder provided at one end and a second bicycle holder provided at a second end;
a tripod head;
a plurality of hollow elongated frame elements that are selectively removable from the bag;
wherein the bicycle supporting frame structure is operable to be provided in a first bicycle supporting and transport configuration, and is operable to be provided in a second bicycle supporting and service configuration outside of the covering;
wherein the transport bag comprises wheels and a pull-handle;
wherein the second bicycle supporting configuration comprises a work stand wherein the hollow elongated frame elements are inserted into the tripod head to form tripod legs.

13. The bicycle transport bag of claim 12, wherein the covering comprises a collapsible covering.

14. The bicycle transport bag of claim 12, wherein the covering comprises at least one of straps, claps, buttons and zippers.

15. The bicycle transport bag of claim 12, wherein the tripod head comprises a clamp that allows horizontal adjustment of the position of the center of gravity of a bicycle mounted on the work stand.

* * * * *